United States Patent [19]

Sampsell

[11] Patent Number: 5,325,116
[45] Date of Patent: Jun. 28, 1994

[54] DEVICE FOR WRITING TO AND READING FROM OPTICAL STORAGE MEDIA

[75] Inventor: Jeffrey B. Sampsell, Plano, Tex.

[73] Assignee: Texas Instruments Incorporated, Dallas, Tex.

[21] Appl. No.: 947,248

[22] Filed: Sep. 18, 1992

[51] Int. Cl.$^5$ ............................................. G01D 9/42
[52] U.S. Cl. ..................................... 346/108; 353/119
[58] Field of Search ................. 346/108; 353/119, 122

[56] References Cited

U.S. PATENT DOCUMENTS

| | | | |
|---|---|---|---|
| 4,089,450 | 5/1978 | Koester | 353/122 |
| 4,090,206 | 5/1978 | Pfeifer | 346/107 R |
| 4,566,015 | 6/1986 | MacKenzie | 346/107 R |
| 4,810,058 | 3/1989 | Sangyoji et al. | 346/160 |
| 4,851,924 | 7/1989 | Nakamura et al. | 353/122 |
| 5,059,020 | 10/1991 | Genieis | 353/122 |
| 5,105,369 | 4/1992 | Nelson | 364/525 |
| 5,132,833 | 7/1992 | Diau | 359/196 |
| 5,184,245 | 2/1993 | Murakami et al. | 359/196 |
| 5,200,849 | 4/1993 | Inagaki et al. | 359/196 |

FOREIGN PATENT DOCUMENTS 2349400  10/1972  Fed. Rep. of Germany ...... 353/122

*Primary Examiner*—John T. Kwon
*Attorney, Agent, or Firm*—Julie L. Reed; James C. Kesterson; Richard L. Donaldson

[57] ABSTRACT

A system for writing to, and reading from, optical media. For writing, the media changes when subjected to high intensity modulated light representing an image, such that the image is recorded. A deformable micromirror device (DMD) receives electrical input representing the image to be recorded. A high intensity light source illuminates the DMD, which reflects modulated light to an imaging lens. The lens focusses the image onto the media. To record multiple images on the same media, various embodiments provide for scanning across the media. For reading, the media is illuminated with uniform low intensity light. The DMD provides this uniform light, which is transmitted through a prerecorded media to an image capture device.

19 Claims, 4 Drawing Sheets

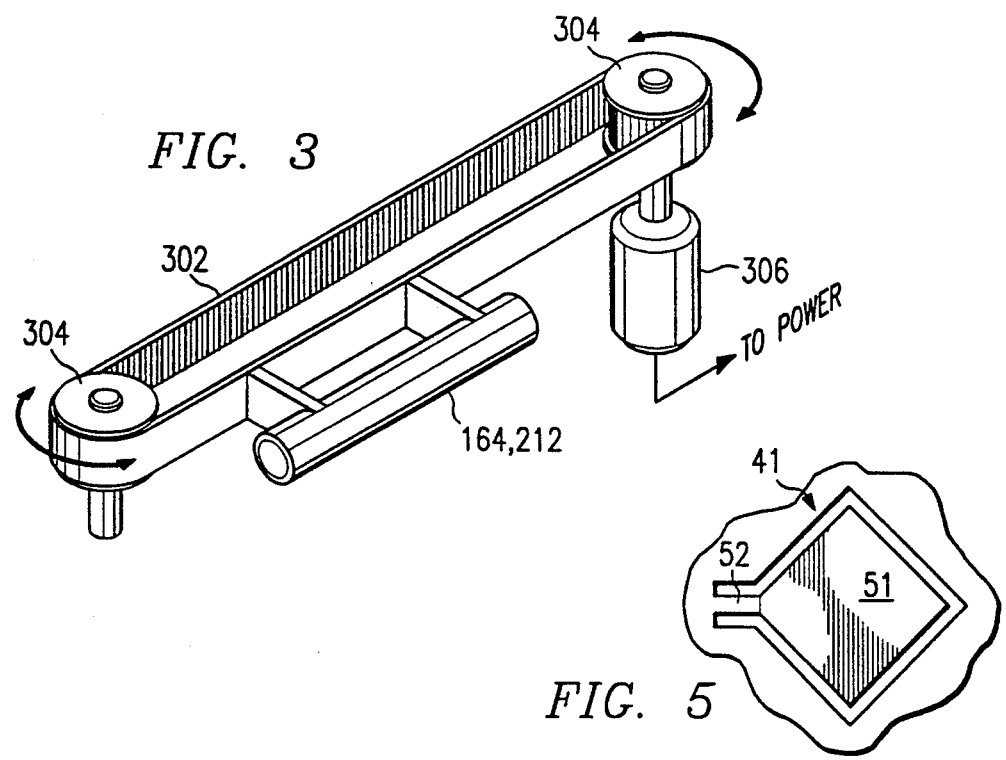
FIG. 3
FIG. 5
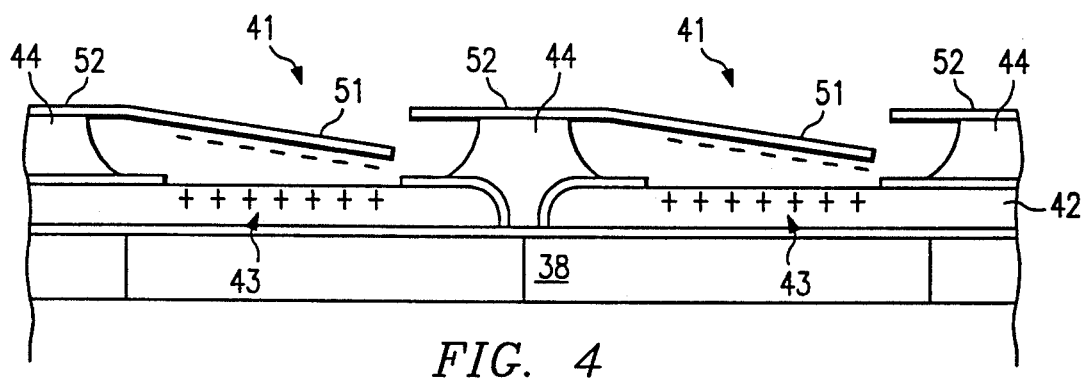
FIG. 4
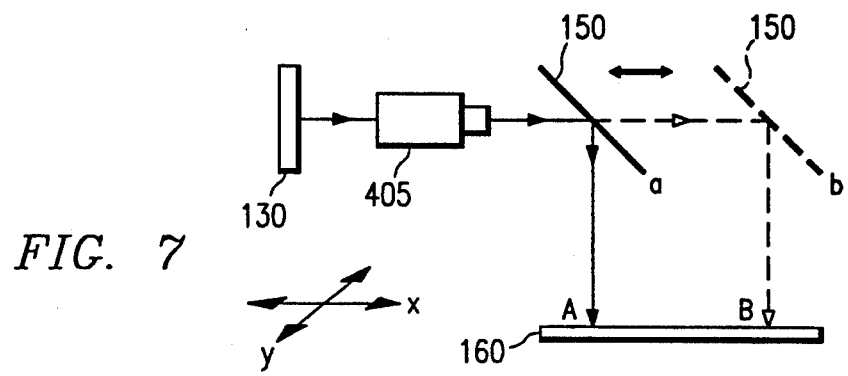
FIG. 7

DEVICE FOR WRITING TO AND READING FROM OPTICAL STORAGE MEDIA

TECHNICAL FIELD OF THE INVENTION

This invention relates to data processing equipment, and more particularly to a device for writing optical data to, and reading data from, a mass optical storage media.

BACKGROUND OF THE INVENTION

In optical computing, two types of memory are used. One is essentially the same as the primary memory of conventional electronic computers, and consists of one-bitstore elements. The other is mass optical storage, which is implemented with optical disks or holographic storage devices. Mass optical storage provides very high capacity and is in common use with electronic computers, with interfaces to electronic computing devices.

Read only optical disks work by changing the reflective surface of a recording media, typically by subjecting them to modulated laser light. They were developed by the entertainment industry for storage and reproduction of video and music. Only later were they adapted for computer user. Erasable magnetoptic disks are also now in use for computing applications.

With regard to holographic disks, the basic scheme is to arrange data as "pages" which are then recorded on holograms. To retrieve data, the appropriate page is reconstructed from the hologram by transmitting light through it to a photodetector. Materials, such as thermoplastics have been developed that allow for both writing and erasing of holograms.

Attempts to develop erasable optical media that will permit real time recording have been fairly successful. Certain media have been found to react to intense incident light, which represents an image, in a manner that permits an image to be recorded. For example, the media might change its refractivity or reflectivity in response to the image. Subsequent illumination of the material by lower intensity light reproduces the image. Another image is recorded by again subjecting the media to high intensity light representing that image.

Despite these attempts to develop real time media, a problem still exists with regard to providing the necessary optical input. A need exists for an optical recording unit that will provide real time optical input to an optical media.

SUMMARY OF THE INVENTION

One aspect of the invention is an optical recorder for writing image data to an optical media that is capable of recording an optical image in response to modulated light. An illumination source provides light for writing to the media. A condensing lens focusses light from the source to a micro-mirror spatial light modulator, which has an array of micro-mechanical mirror elements and an addressing means for providing electrical input to each of the mirror elements. The electrical inputs to the array represent an image to be recorded. Each mirror element is capable of reflecting light in a desired direction in response to the electrical input, such that light reflected from the array is amplitude- modulated light representing the image. An imaging lens receives the modulated light from the spatial light modulator and focusses this light to an image frame position on an optical media. A scanning mechanism provides relative motion between the imaging lens and the media in so that different image frame position can be written to.

The recorder may also be used for reading data from the media. The spatial light modulator is used to illuminate the media. An image capture device having an array of sensor elements whose number corresponds to the number of spatial light modulator elements, receives an image frame from the media.

A technical advantage of the invention is that it permits writing and reading to be performed as massively parallel operations. Each new image frame position is capable of being read, or written to, with as many bit positions, in parallel, as are available on the spatial light modulator, and image capture device, which can easily be $1000 \times 1000$ bits. This data can be read into the spatial light modulator, or out of the image capture device, with parallel bit lines at rates faster than current processor data rates.

Although the media is scanned by means of stepped x-y motion, the parallel nature of writing and reading provides time for scanning from one image frame to another. Also, alignment problems are alleviated by the large amount of data in each frame, as well as by the relatively large sensor size.

BRIEF DESCRIPTION OF THE DRAWINGS

FIG. 3 illustrates an actuator for the linear bearings of FIGS. 1 and 2;

FIGS. 4 and 5 illustrate a micro-mirror spatial light modulator such as is used with the recorder of FIGS. 1 and 2;

FIG. 7 illustrates the internal light path and how its length changes as a result of the scan mirror motion.

DETAILED DESCRIPTION OF THE INVENTION

Figure 1:
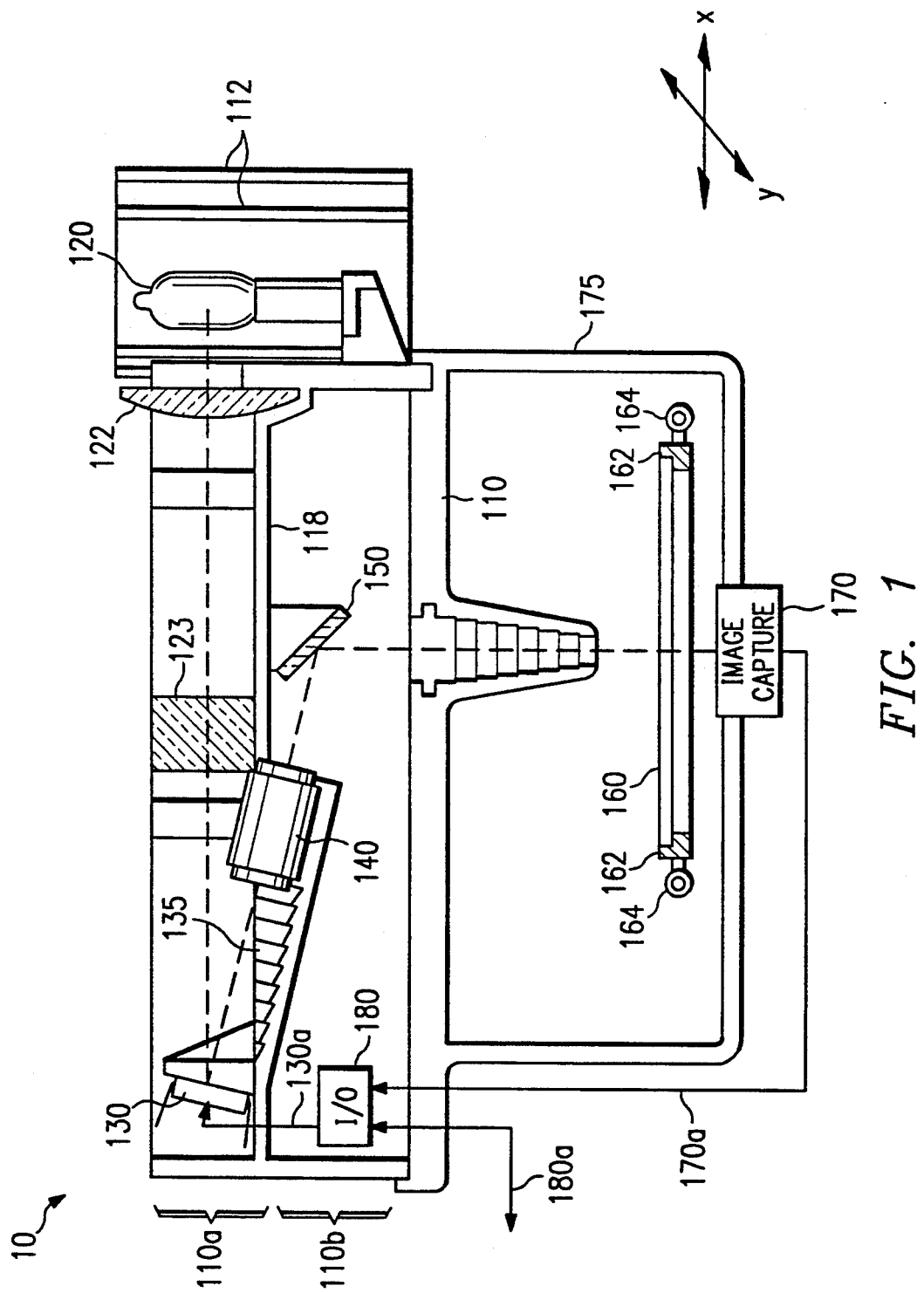
FIG. 1 is a side view of an optical recorder in accordance with the invention, having a moveable media holder and moveable housing for scanning rows and columns of the media.
Figure 2:
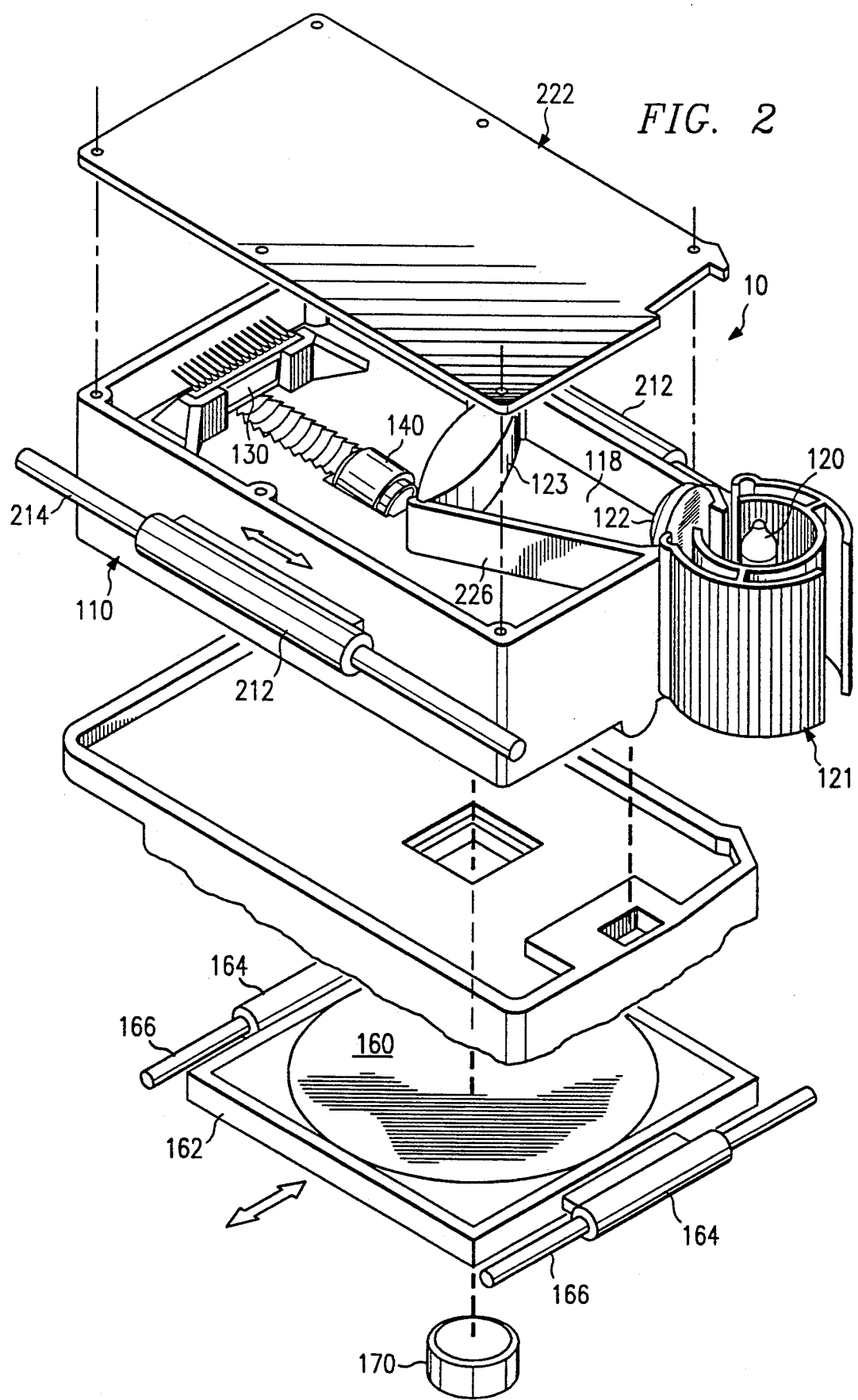
FIG. 2 is a perspective view of the optical recorder of FIG. 1.

FIGS. 1 and 2 are a side view and a perspective view of an optical recorder 10 in accordance with the invention. The recorder 10 is in a housing 110, which is divided into an upper housing 110a and a lower housing 110b by an internal partition 118. In general, upper housing 110a provides a light path from source 120 to deformable micro-mirror device (DMD) 130 to lens 140. Lower housing 110b provides a light path from lens 140 to mirror 150 to a point on the surface of an optical media 160. Image capture device 170 is used for reading.

As will be explained below, the invention makes use of DMD 130 to provide either a modulated signal for writing data to media 160, or an unmodulated signal for reading media 160. As an overview of the operation of recorder 10, for writing data to media 160, an electronic signal representing an image is communicated to DMD 130. DMD 130 is a type of spatial light modulator, which has a rectangular array of micro-mechanical mirror elements. Each mirror element is separately addressable with an electronic input. This input controls whether the mirror element will deflect light toward or away from lens 140. By setting the position of each mirror element and illuminating the reflective surface of the DMD array, the DMD 130 modulates the incident light and reflects the image represented by the input data.

DMD mirror elements that are positioned to direct light to lens 140 are referred to herein as "illuminating" mirror elements. For writing data, the mirror elements of DMD 130 are set in accordance with electronic input representing an image to be recorded. Source 120 illuminates the surface of DMD 130. This incident light is modulated by DMD 130 resulting in an image directed to lens 140, which directs and focusses the light to media 160 via mirror 150. For reading, all mirror elements are illuminating, so as to provide uniform light to be transmitted through a pre-recorded media 160 to an image capture device 170. As explained below, typically, source 120 provides a high intensity light for writing and a lower intensity light for reading. Thus, DMD 130 provides amplitude modulated light of a high intensity and unmodulated light of a lower intensity.

A feature of the invention is the ability to scan rows and columns of media 160 to write or read a number of image frames. Each image frame is stored at a unique row and column position, i e , an "image frame position" on media 160.

In the embodiment of FIGS. 1 and 2, both housing 110 and media 160 are moveable. To this end, media 160 is placed in a holder 162 having bearings 164, which permit it to slide back and forth in a linear scan direction along parallel rods 166. An example of a suitable media holder 162 is one that supports media 160 around its rim or outer edges, thereby permitting light to be transmitted through media 160 during reading. Similarly, housing 110 has bearings 212 on opposing sides, which permit it to move in a second linear scan direction along rods 214, perpendicular to and in a plane parallel to the first scan direction. In FIGS. 1 and 2, housing 110 moves in the x direction and media 160 moves independently in the y direction.

FIG. 3 illustrates an actuator for use in devices where the scanning motion is provided with bearings and rods, such as those of FIGS. 1 and 2. One of a pair of bearings, such as bearings 164 or 212 is attached to a belt 302, which is supported between two take-up wheels 304. One of the wheels 282 is attached to a stepper motor 306 which causes the wheel to turn in a stepped motion. As the wheel turns, the bearing 164 or 212 changes position along its rod.

In another embodiment of the invention, the x-y scanning motion could be accomplished with a means for moving media 160 in both the x and the y direction. In a third embodiment, the x-y motion could be accomplished with a means for moving housing 110 in both the x and the y direction. Bearing and rod type mechanisms could be used to provide this motion, or other mechanisms known in the art of devices that scan a Surface in one or more directions.

Regardless of the type of scanning mechanism that is used, a common feature is that there be relative motion between light from mirror 160 and the surface of media 160 in two directions. This permits any image frame on media 160 to be accessed.

In a fourth embodiment, media 160 moves in one scan direction, and mirror 150 is moveable in the other scan direction. This fourth embodiment is discussed below in connection with FIGS. 4–6.

Referring again to FIG. 1, various electrical connections are shown. In a typical application, the modulation input to DMD 130 (for writing) and the output from image capture device 170 (for reading) would be handled by a processor (not shown) via a common input/output interface 180 and a bus 180a. Electrical connections to DMD 130 and image to capture device 170 from input/output interface 180 are shown as connections 130a and 170a, respectively. A power line (not shown) connects light source 120 to a power supply.

Source 120 is aligned with an internal optics path, shown in dotted lines in FIG. 1. Although FIGS. 1 and 2 show source 120 as an incandescent light bulb, source 120 may be any type of light source. Examples are tungsten halogen bulbs or light emitting diodes.

If source 120 is heat generating, housing 110 may be constructed of a low coefficient of expansion material, so that the heat will not cause appreciable stress. Also to this end, source 120 may be placed outside the main body of housing 110 and contained in a chimney 112, made from a material such as aluminum that absorbs and disperses heat.

An advantage of the invention is that source 120 may be a white light source. It need not provide coherent light as do the lasers of other optical recording devices, although a laser source, such as a laser diode, may be used. Source 120 may be variable so as to provide a lower intensity light for reading media 160. Alternatively, other means, such as uniform modulation by DMD 130 could be used to lessen the intensity of the light to lens 140 during reading. Source 120 may be an "instrumentation lamp" having features that facilitate alignment.

Light from source 120 is focused by a heat resistant spherical lens 122 onto lens 123, which directs the light to DMD 130. Lens 123 is mounted in a manner that permits it to expand along a longitudinal axis, which permits it to be made from a plastic material having a higher thermal expansion factor than that of housing 110. This is desirable because lens 123 has a complex aspheric surface design and is relatively large. Lenses 122 and 123 together comprise condenser optics, which provides uniform illumination of DMD 130.

DMD 130 is held approximately perpendicular to partition 118. As stated above, DMD 130 is an array of reflective, micro-mechanical elements, whose movement modulates incident light. Addressing is by means of an electrical input to each element, which results in positioning each element to one of at least two states. An entire image is represented by simultaneously addressing all elements of the DMD 130.

DMD 130 is typically fabricated as an integrated circuit. FIG. 4 illustrates two mirror elements 41 of such a DMD 130. Mirror elements 41 are atop an address plane 42, which provides the electrical input to each mirror element 41. In the preferred embodiment, each mirror element 41 is associated with a memory cell 43, which stores either an on or an off signal. To prevent the need for an input line to each mirror element 41, various input techniques using shift registers and/or multiplexed addressing may be used.

FIG. 5 is a top plan view of a mirror element 41. It has a mirror portion 51 and a flexible hinge 52. Referring to both FIGS. 4 and 5, beam 51 is suspended over an air gap and connected to a support post 44 by means of hinge 52.

In operation, portions of address layer 42 underlying mirror elements 41 are selectively energized. Mirror element 41 is a cantilever type mirror element, in that the free end of beam 51 is attracted toward the charged electrode portion of address layer 42. Thus, mirror element 41 has at least one "on" and one "off" position. When mirror element 41 is in an on position, the light incident on DMD 130 is redirected toward lens 140 and hence to media 160. When mirror element 41 is in an off position, light is not directed to lens 140 and media 160 does not receive light from that mirror element 41.

The cantilever-beam pixel of FIGS. 4 and 5 is only one type of DMD architecture, and many other architectures are possible. These are distinguished by characteristics such as their deformation mode, pixel shape, and the hinge support architecture. However, for purposes of the invention herein, any sort of DMD architecture is satisfactory so long as each mirror element is capable of independent movement.

Further details about the general structure and operation of DMD's, applicable in general to DMD 130 are set out in U.S. Pat. Nos. 4,566,935; 4,596,992; 4,615,595; 4,662,746; and 4,710,732, which are incorporated herein by reference.

As an example of an actual DMD 130, it has an array of 1024×1024 mirror elements 41. Each mirror element 41 has a surface area in the order of 0.8 milli-inches×0.8 milli-inches. Thus, DMD 130 has a Surface area in the order of 0.8×0.8 inches. If it is assumed that the internal optics of recorder 10 demagnify the image from DMD 130 by 5×, and that media 160 has a 5.25 inch by 5.25 inch surface area for writing data, approximately $(5.25/.16)^2$, or approximately 1000 image frames can be recorded on a single media 160.

Referring again to FIGS. 1 and 2, a light channel 135 creates an optical path for light from DMD 130 to lens 140. Light channel 135 is designed to scatter light from mirror elements that are not intended to be illuminating so that it does not reach lens 140. For achieving this scattering, channel 135 has saw tooth edges formed at least partially circumferentially around its optical axis. Any other type of "light trap" that enhances the ability to direct only the image from DMD 130 to media 160 may be used. Examples of other light trapping means are baffles that catch off axis light.

Imaging lens 140 is at a second end of channel 135 and receives the illuminating light from DMD 130. During writing, lens 140 focusses this light to media 160 via mirror 150 and creates the same image on media 160 as is reflected from DMD 130. During reading, lens 140 simply provides uniform light to be transmitted through media 160.

The structure and operation of the components of upper housing 110a are discussed in detail in U.S. Pat. No. 5,105,369, entitled "Printing System Exposure Module Alignment Method and Apparatus of Manufacture". That patent is incorporated by reference herein. It uses a fixed lens to receive rows of an image from a DMD and focus them to a printing surface.

Referring now to the lower housing 110b of FIG. 1, mirror 150 directs the light from imaging lens 140 to a selected image frame position on media 160. A light channel 152, like channel 135, is designed to prevent stray light from reaching the surface of media 160.

Media 160 is any sort of optical recording media that changes some physical property when subjected to a recording light having a certain modulation that represents an image. The modulation may be either amplitude or phase, resulting in corresponding changes to the media, such that the changes remain when the recording light is removed. Furthermore, if the media 160 is subjected to a reading light, it transmits the image.

In the example of this description, media 160 is sensitive, for writing purposes, to light above a certain amplitude threshold. Thus, light of a higher intensity is used for writing than for reading. However, other types of media 160 could be used, such as media that is sensitive to variations in wavelength or phase. In the case of wavelength sensitivity, two different sources 110 could be used, each having a different wavelength, or a single source 110 could be used with different filters. In the case of phase sensitivity, DMD 130 would modulate phase rather than amplitude. A type of phase modulating DMD suitable for this application is described in U.S. Pat. No. 4,954,789 to Sampsell. For a phase modulated image, source 120 would be a coherent source and would provide a reference beam to meet the modulated beam at some point in the light path.

Image capture device 170 is used during reading of media 160. For reading, source 120 provides light of uniform intensity, lower than that used for writing. This light is directed to DMD 130, whose mirror elements 41 are positioned so that the light reflected by DMD 130 is illuminating but not modulated. This light illuminates the surface of media 160, which transmits the image to image capture device 170. Image capture device 170 may be a charge coupled device (CCD), which provides electronic signal representing the image to a processor. Image capture device 170 may also be a binary image sensing device, such as a dynamic random access memory (DRAM) configured to store binary data in response to optical input. Typically, image capture device 170 has an array of point detector elements, with the number of point detectors corresponding to the number of mirror elements 41 of DMD 130.

In embodiments in which housing 110 moves to provide scanning motion, image capture device 170 is attached to housing 110. As a result, when housing 110 moves, image capture device 170 moves the same amount. This facilitates alignment for reading purposes.

Figure 6:
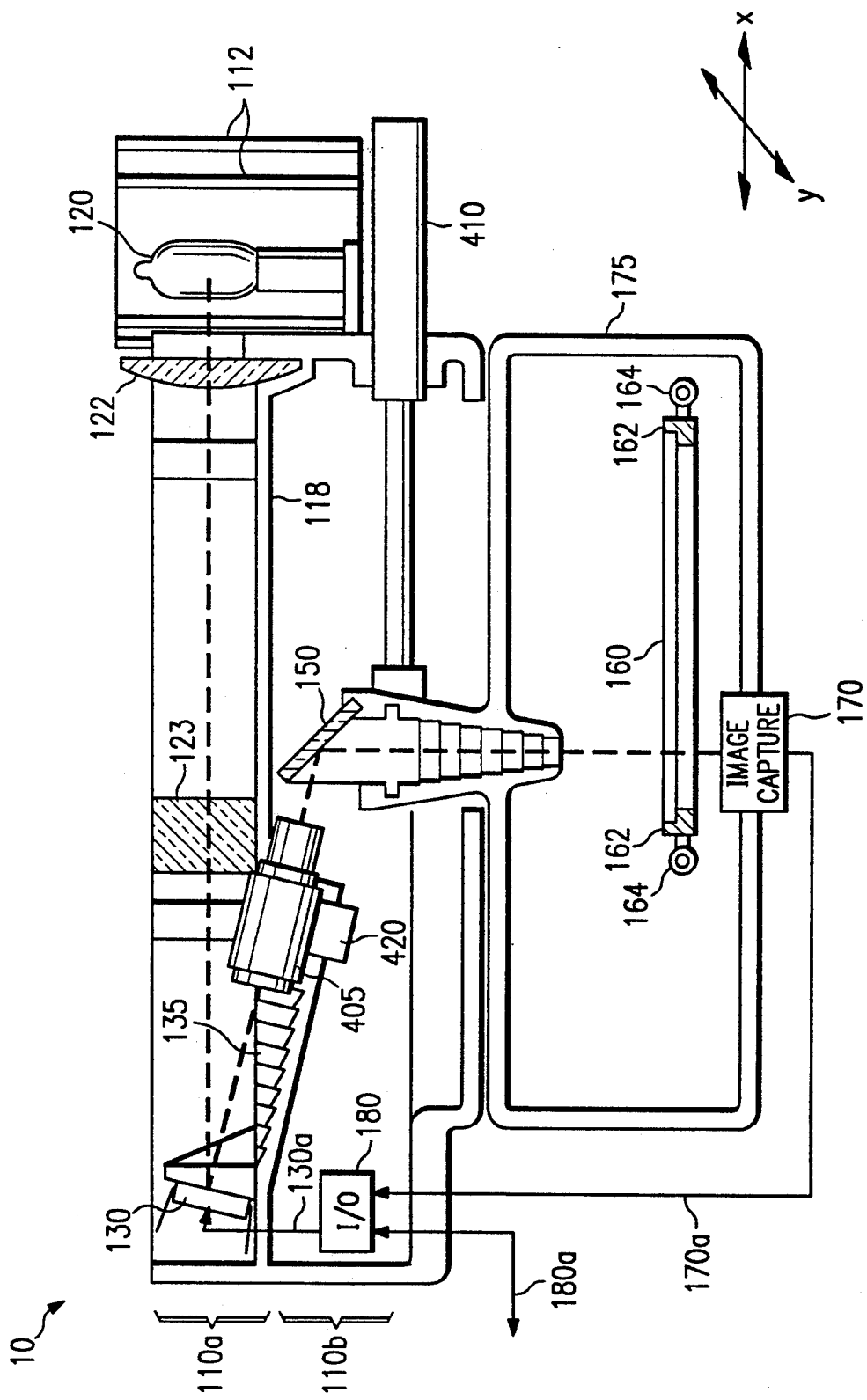
FIG. 6 illustrates an alternative embodiment of the optical recorder, in which one of the scanning motions is provided by a moveable scan mirror.

FIG. 6 illustrates an alternative embodiment of the invention, in which one of the scanning motions is provided by making mirror 150 moveable. Also, as explained below in connection with FIG. 5, lens 140 is replaced with variable focus lens 405. A mirror actuator 410 provides the motion for mirror 150, and a lens actuator 420 provides the variable focus for lens 405. The embodiment of FIG. 4 is especially useful when optical recorder 10 is desired to be small in size. Because mirror 150 moves internally, only one other scan motion of housing 110 relative to media 160 is required. Thus, either housing 110 or media 160 may be made moveable by the means discussed above or by some other means.

For writing to different image frame positions, mirror 150 moves back and forth, in pre-determined increments, to scan media 160 in one direction, i.e., direction "x". An image frame is recorded for each incremental movement of mirror 150. When a row of media 160 is filled with images, media 160 or housing 110 moves so that a new row is positioned under the image plane of mirror 150.

Actuator 420 moves mirror 150 with a stepped motion in predetermined and uniform increments so that each new position permits a new image frame to be recorded on media 160. The motion of mirror 150 is synchronized with the input to DMD 130, so it moves after DMD 130 is addressed with and modulates a new image. In a typical application, mirror 150 moves so that each new image frame is imaged to an adjacent position in a row of media 160. However, the scanning movement in one or both directions could be controlled to permit random access to any location on media 160.

FIG. 7 illustrates the optical path of light reflected from mirror elements 310 of DMD 130 to media 160. Mirror 150 is shown in two positions, which correspond to points A and B of the media. The movement of mirror 150 from position a to position b results in the path length from DMD 130 to point A being shorter than that from DMD 130 to point B. It is for this reason that lens 405 has a variable focus for the modulated light. For each movement of mirror 150, a corresponding change in focus of lens 405 is accomplished.

In the embodiment of FIG. 7, lens 405 and its actuator 420 are a commercially available "zoom" lens with some sort of means for relating its movement to that of mirror 150. This might be accomplished with providing an "intelligent" actuator 420, which is in communication with actuator 410. A simple look up table stored in a read only memory of actuator 420 could relate the two motions. Or, the actuators 410 and 420 could be linked with gear mechanisms so that their movements are mechanically related.

In the embodiment of FIG. 7, an arm 430 may be attached to both mirror 150 and image capture device 170, at least during reading. Arm 175 is moveable within housing 110. Because mirror 150 and image capture unit 170 are attached by arm 175, when mirror 150 moves over media 160, image capture device 170 moves the same amount under media 160.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A optical recorder for writing image data to an optical media that is capable of recording an optical image in response to modulated light, comprising:
   an illumination source for providing light for writing to said media;
   at least one condensing lens for focussing light from said source to a micro-mirror spatial light modulator;
   a micro-mirror spatial light modulator having an array of micro-mechanical mirror elements, and an addressing means for providing electrical input to each of said mirror elements, wherein the electrical inputs to said array represent an image to be recorded, and wherein each mirror element is capable of reflecting light in a desired direction in response to said electrical input, such that light reflected from said array is amplitude modulated light representing said image;
   an imaging lens for receiving said modulated light from said spatial light modulator and for focussing said light to an image frame position on an optical media; and
   a first scan motion means for moving light from said imaging lens relative to the surface of said media in a first scan direction; and
   a second scan motion means for moving the image plane of said imaging lens relative to the surface of said media in a second scan direction perpendicular to said first scan direction.

2. The optical recorder of claim 1, and further comprising a housing for containing said source, lens, spatial light modulator, and mirror, and wherein at least one of said first and said second scan motion means is means for moving said housing.

3. The optical recorder of claim 1, and further comprising a holder for removably securing said media, and wherein at least one of said first and said second scan motion means is means for moving said holder.

4. The optical recorder of claim 1, and further comprising a moveable scan mirror for receiving said image from said imaging lens, an actuator for controlling the motion of said scan mirror, and wherein said lens is a variable focus lens with a lens actuator for controlling its focus.

5. The optical recorder of claim 4, wherein said variable focus lens is a zoom lens.

6. The optical recorder of claim 4, wherein said lens actuator and said mirror actuator means are in communication, such that said lens actuator acts in response to said mirror actuator.

7. The optical recorder of claim 1, and further comprising an input interface for communicating electrical image data input to said spatial light modulator from a processor.

8. The optical recorder of claim 1, and further comprising an image capture device for reading said media.

9. A method of writing to an optical media that is capable of recording an optical image in response to modulated light, comprising the steps of:
   providing data representing an image to be recorded to a micro-mirror spatial light modulator having an array of micro-mechanical mirror elements, and an addressing means for providing electrical input to each of said mirror elements, wherein the electrical input to said array represents an image, wherein each mirror element is capable of tilting in a desired direction in response to said electrical input, such that light reflected from said array is modulated light representing said image;
   illuminating the surface of said spatial light modulator;
   modulating the illuminating light in accordance with said electrical input;
   using a lens to receive the modulated light from said spatial light modulator and to direct said light to an image frame position on said media; and
   for each new image to be recorded, providing relative motion with respect to said media and the image plane of said lens, such that said lens is directed to a new image frame position.

10. The method of claim 9, wherein said step of providing relative motion comprises moving a housing containing said spatial light modulator and said lens over the surface of said media.

11. The method of claim 9, wherein said step of providing relative motion comprises moving said media under the light from said lens.

12. The method of claim 9, wherein said step of providing relative motion comprises directing light from said lens to a scan mirror and moving said scan mirror to said new image frame position, and refocussing said lens to said new image frame position.

13. The method of claim 12, and further comprising the step of using an actuator of said mirror to generate a signal representing the motion of said mirror and communicating said signal to an actuator of said lens.

14. The method of claim 12, wherein said step of refocussing said lens is accomplished by directing light from said scan mirror to a moveable focussing mirror, which moves in response to movement of said scanning mirror, and directs light to said new image frame position.

15. The method of claim 9, wherein said method is also for reading pre-recorded media, and further comprising the steps of using said spatial light modulator to provide light for reading said media, and capturing light transmitted through a prerecorded media.

16. A device for writing to and reading from an optical media that is capable of recording an optical image in response to modulated light, comprising:

an illumination source for providing high intensity light for writing to said media and lower intensity light for reading from said media;

at least one condensing lens for focussing light from said source to a digital micro-mirror device;

a micro-mirror spatial light modulator having an array of micro-mechanical mirror elements, and an addressing means for providing electrical input to each of said mirror elements, wherein the electrical inputs to said array represent an image to be recorded, wherein each mirror element is capable of moving to a desired direction in response to said electrical input, such that modulated light representing said image will be reflected from said array for writing to said media or such that uniform light may be reflected from said array for reading said media;

an imaging lens for receiving said modulated light from said spatial light modulator and for focussing said light to a frame portion of an optical media;

an image capture device for receiving light transmitted through said media during reading;

a first scan motion means for moving light from said imaging lens relative to the surface of said media in a first scan direction; and a second scan motion means for moving the image plane of said imaging lens relative to the surface of said media in a second scan direction perpendicular to said first scan direction.

17. The optical recorder of claim 16, and further comprising a housing for containing said source, lens, spatial light modulator, and mirror, and wherein at least one of said first and said second scan motion means is means for moving said housing.

18. The optical recorder of claim 16, and further comprising a holder for removably securing said media, and wherein at least one of said first and said second scan motion means is means for moving said holder.

19. The optical recorder of claim 16, and further comprising a moveable scan mirror for receiving said image from said imaging lens and an actuator for controlling the motion of said scan mirror, and wherein said lens is a variable focus lens having a lens actuator for controlling its focus.

* * * * *